United States Patent [19]

Preisser

[11] Patent Number: 5,312,051
[45] Date of Patent: May 17, 1994

[54] FRESH WET CONCRETE RECLAIMER

[75] Inventor: Mark Preisser, Haven, Kans.

[73] Assignee: Haahjem North America, Inc., Haven, Kans.

[21] Appl. No.: 41,320

[22] Filed: Mar. 31, 1993

[51] Int. Cl.$^5$ .................. B02C 17/02; B02C 23/18
[52] U.S. Cl. .......................... 241/1; 241/15; 241/20; 241/41; 241/72; 241/79.3; 241/301
[58] Field of Search ............. 241/20, 72, 79.1, 79.3, 241/41, 15, 1, 301

[56] References Cited

U.S. PATENT DOCUMENTS

| | | |
|---|---|---|
| 1,378,623 | 5/1921 | Schaffer . |
| 1,458,387 | 6/1923 | Bourne .................. 241/79.1 |
| 1,461,067 | 7/1923 | Moser . |
| 1,577,136 | 3/1926 | Markman . |
| 2,983,378 | 5/1961 | Hilkemeier . |
| 4,140,629 | 2/1979 | Martindale .............. 209/240 |
| 4,236,999 | 12/1980 | Burgess .................. 209/250 |
| 4,418,871 | 12/1983 | Powell ..................... 241/1 |
| 4,616,786 | 10/1986 | Riker ...................... 241/35 |
| 5,108,584 | 4/1992 | Brosseuk ................. 209/44 |
| 5,234,172 | 8/1993 | Chupka et al. ........... 241/301 |

Primary Examiner—Mark Rosenbaum
Assistant Examiner—John M. Husar
Attorney, Agent, or Firm—Richard C. Litman

[57] ABSTRACT

A concrete reclaimer includes a concrete processor having a rotating inclined screen and a pipe discharging water. Fresh concrete being disposed is poured into an open end of the rotating screen, and migrates toward the opposite open end. The concrete passes over a fine mesh and then a coarse mesh screen, washing out cement slurry when passing over the former, and removing sand when passing over the latter. Gravel is discharged from the remaining screen open end. Specially configured nozzles are arranged in a particular pattern along the pipe. Collection and storage pits are provided for the resultant segregated cement slurry, sand, and gravel. In a preferred embodiment, a concrete processor includes a five horsepower pump and a ten horsepower screen rotation motor. With the screen inclined at 8 degrees from the horizontal and rotating so as to move the screen past an arbitrary stationary reference point at 330 feet per minute and with water being fed at 178 gallons per minute at a pressure of 12 pounds per square inch, the concrete processor separates one cubic yard of concrete per minute.

16 Claims, 5 Drawing Sheets

FRESH WET CONCRETE RECLAIMER

BACKGROUND OF THE INVENTION

1. Field of the Invention

The present invention relates to an apparatus for separating components of waste or surplus fresh concrete or the like for subsequent recovery and recycling thereof. The concrete is in a mixed, wet, plastic condition, ready for use when put into the novel concrete reclaimer prior to separation, recovery, and recycling.

2. Description of the Prior Art

Apparatus including a rotary screen for separating or components from aggregates or pulps, such as sand and gravel mixtures, concrete mixtures, and ash residues containing larger particles, such as slag and coal, are known. In those instances wherein the solid is substantially homogeneous and mere dewatering is required, gravitational and centrifugal action alone may satisfy the requirement. An example of a rotary screen having open ends and being supported on and driven by rollers is seen in U.S. Pat. No. 4,236,999, issued on Dec. 2, 1980, to George Burgess et al. Because the purpose of this invention is simple dewatering, the substance being treated is introduced into the screen in a trough inside the cylindrical screen extending the entire length therealong. Solids, to the extent that liquids are removed from the original substance, are discharged axially at an open end of the cylindrical screen.

In a closely related invention, seen in U.S. Pat. No. 4,140,629, issued to James H. Martindale on Feb. 20, 1979, material for dewatering is introduced into one open end of a cylindrical screen and migrates toward the other open end. A shower provides water for separation of certain solids from others. Unlike the invention of the present invention, the separator includes radial struts connecting the cylindrical screen to a central support bar, the shower comprises water flowing under influence of gravity from the top of the screen thereinto, and internal baffles are provided to obstruct rapid migration of the initial material through the separator.

Separation into three streams by size is illustrated in U.S. Pat. No. 1,577,136, issued to John Markman on Mar. 16, 1926. A rotary screen has three grades of mesh fineness. The screen is enclosed within a housing having constricted ends, so that loading and discharge through the open ends of the screen are rendered more difficult. No water is employed to facilitate separation.

A rotary screen separator employing water delivered by a pipe extending through and inside the screen is seen in U.S. Pat. No. 1,378,623, issued to Henry J. Schaffer on May 17, 1921. The screen is slightly inclined with respect to the horizontal to facilitate migration of solids therethrough. The water is used to suppress dust, and is discharged "in various directions" (page 2, lines 79-80) from the pipe.

U.S. Pat. No. 1,461,067, issued to Robert W. Moser on Jul. 10, 1923, discloses a sand and gravel washing and sorting apparatus including an inlet chute into which is discharged water. No water is introduced into the sorting screen.

Two patents directed toward separating fresh concrete into its constituent components for disposal of waste concrete and subsequent reclamation of recovered components are seen in U.S. Pat. Nos. 2,983,378 and 4,616,786, issued respectively to Louis G. Hilkemeier on May 9, 1961 and to Rudolf Riker on Oct. 14, 1986. These inventions include screw or baffles facilitating transport of the fresh concrete through the respective apparatus. Both also feature immersion of the concrete or of some residual solids in standing water. Riker provides only immersion contact of solids with water. Hilkemeier sprays a portion of the concrete, and immerses another portion.

At least a portion of the components are conveyed upwardly through the screen, against gravity, in the Hilkemeier device. The Riker apparatus includes a separate receiving bin, requires scooping buckets and an elevator to move separated components upwardly for storage or removal, and has timed spraying cycles.

There remains a need for an uncomplicated, efficient separator for fresh concrete. None of the above inventions and patents, taken either singly or in combination, is seen to describe the instant invention as claimed.

SUMMARY OF THE INVENTION

The present invention is directed toward an apparatus for disposing of waste or surplus fresh concrete. Concrete which has been mixed with water, thus being in a wet, plastic, somewhat coherent aggregate form, will hereinafter be referred to as fresh concrete. Concrete is mixed for use in large batches, and is typically delivered to a point of use in trucks loaded approximately to 6 to 11 cubic yards (4.5 to 8.5 cubic meters). These trucks may possibly return to the concrete plant with a partial load of unused concrete. The Environmental Protection Agency of the U.S. Government is now prohibiting disposal of such unused concrete as by discharging onto the ground, and instead is requiring reclamation of components of unused concrete for recycling. The present invention discloses apparatus to accomplish this end.

As opposed to dry aggregates such as ashes and related products of combustion, or to dry mixtures of particles of varying dimensions, such as sand and gravel mixtures, handling of fresh concrete requires consideration of properties unique thereto. Spraying with water affects the interaction among sand, gravel, and cement such that surface tension of the wet aggregate is altered. Thus, tendency of the wet aggregate to clump is reduced, and the aggregate will behave more fluently, and fine components and cement are more easily washed away.

The present invention provides a concrete reclaimer having an inclined rotary screen in combination with a spray bar which runs parallel to the rotary screen, but slightly eccentrically thereto. The spray bar applies water more effectively and efficiently than is accomplished in the prior art by virtue of configuration of the spray jet and angle of impingement of the spray jet on the concrete. These characteristics are imparted by configuration and placement of nozzles on the spray bar, and interact efficiently with fresh concrete in view of the above discussed properties.

The rotary screen is operated at such a speed as to cause the concrete to remain thereagainst along an arc defined between a lowermost point and a point 90 degrees offset therefrom. Rotation causes the fresh concrete to be drawn upwardly, and as the fluent mass reaches a point halfway to the highest point, a tangent to the cylindrical screen at that point being vertical, the concrete tumbles down. Sprayed water is directed to the middle of this mass, or at an angle approximately 45 degrees offset from the vertical. Concrete and remaining components migrate toward the lower end of the inclined screen in response to gravity.

Concrete is poured into the higher open end of the rotary screen, which has two sections of differing mesh fineness. Cement slurry is discharged through a first, fine mesh, and sand is discharged through a second, relatively coarser mesh. Gravel is discharged through the lower open end of the rotary screen. Chutes direct the respective components into bins or pits for storage.

Use of large quantities of water can readily break down fresh concrete into its constituent components, but this practice exacts a high cost in apparatus size, cost, and space requirements, and will necessarily consume excessive power and possibly water, unless water is recycled.

The concrete reclaimer of the present invention accomplishes disposal of fresh concrete with minimal bulk, complexity, cost, and consumption of power and water. The spray jet and inclined rotary screen, when the latter is operated under optimum conditions specified hereinafter, combine to enable the novel concrete reclaimer to separate waste or surplus fresh concrete at an efficient and convenient rate, while consuming minimal quantities of power and water.

In a preferred embodiment, the novel reclaimer processes one cubic yard (0.8 cubic meter) of concrete per minute. This quantity is desirable since it corresponds to the rate of discharge of a typical cement truck at engine idle speed. While it is possible to discharge at a faster rate, faster rates tend to cause discharge to become sloppy, thus requiring washing of the truck. At this rate of processing concrete, the novel reclaimer consumes between 140 gallons (530 liters) and 215 gallons (815 liters) of water per minute, the screen is rotated by a 10 horsepower (7.5 kilowatt) motor, and a water supply pump need deliver water at 12 pounds per square inch (83 kPa). In a preferred embodiment, the pump is driven by a 5 horsepower (3.5–4 kilowatt) motor.

Relatively few parts are provided which must resist abrasive attack in the harsh environment, and vibrating action, which shortens the life span of all mechanical components subjected to such vibration, is avoided.

Materials flow with, rather than against, gravity, thereby reducing load on the power plant. No portion of the screen is submerged, thus eliminating drag inherent therein, again reducing load on the power plant.

Accordingly, it is a principal object of the invention to provide a concrete reclaimer having an inclined, open ended, cylindrical rotary screen and a spray bar extending through the reclaimer rotary screen and discharging water therefrom along the length of the screen discharging water against concrete along a line of contact offset 45 degrees from the vertical, with respect to the circular screen.

It is another object of the invention to provide chutes for directing cement slurry, sand, and gravel into three separate streams.

It is a further object of the invention to provide a diverter valve and auxiliary water discharge pipe, so that a cement truck operator can use water to wash a truck without water flowing into the rotary screen.

Still another object of the invention is to provide a motorized pump and manual controls therefor, thus enabling the concrete reclaimer to provide pressurized water.

An additional object of the invention is to provide pits for storing cement slurry, sand, gravel, and water.

Still an additional object of the invention is to provide a method of operating a concrete reclaimer such that the screen moves at a rate between 300 feet (100 meters) and 360 feet (120 meters) per minute.

Yet a further object of the invention is to provide a concrete reclaimer which processes one cubic yard (0.8 cubic yard) of concrete per minute.

Still a further object of the invention is to provide a concrete reclaimer which limits water consumption to a range between 140 gallons (530 liters) and 215 gallons (815 liters) per cubic yard (0.8 cubic meter) of concrete processed.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
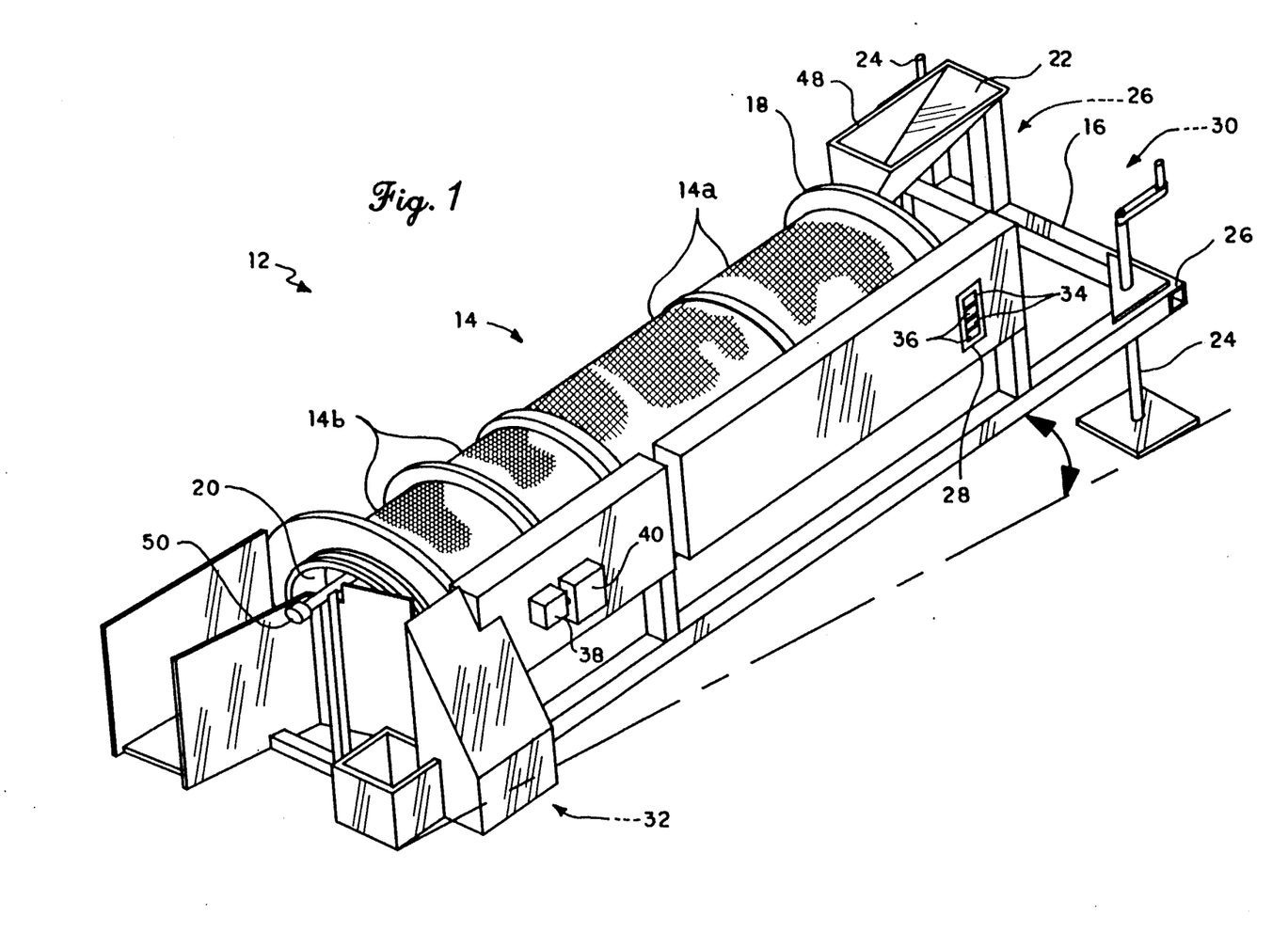
FIG. 1 is an isometric view of the concrete processor of the present invention.

The concrete reclaimer 10 of the present invention includes a concrete processor 12, shown in FIG. 1 to comprise a cylindrical, rotatable screen 14 supported at a slight angle to the horizontal on a frame 16. It is to be understood that any configuration resulting in a body comprising a wall joined to itself, thus producing a closed loop, such as a hexagon, may be employed to define the screen configuration, all such configurations being referred to hereinafter as cylindrical. Screen 14 has relatively fine and coarse screen elements 14A,14B, respectively. Screen elements 14A,14B may be provided as a single part, or as a plurality of parts joined together. both ends 18,20 of the cylindrical screen 14 are open. Discharging into higher open end 18 is an intake hopper 22. Preferably, a cement truck (not shown in FIG. 1) lowers its discharge chute D over intake hopper 22, and discharges fresh concrete thereinto. Intake hopper 22 guides fresh cement into higher end 18.

Frame 16 is supported at a slight angle to the ground, or to any suitable supporting environmental surface. One end of frame 16 is elevated, thereby inclining concrete processor 12 at an angle to the ground. A preferred range of values for this angle of inclination is from one to ten degrees from the horizontal. A screw leg 24 is provided at each upper corner 26 of frame 16 to enable inclination and leveling of concrete processor 12. This angle of inclination and adjustment thereof are illustrated in FIG. 1 with arrows, and the view is exaggerated so as to show clearly that frame 16 is inclined.

Figure 2:
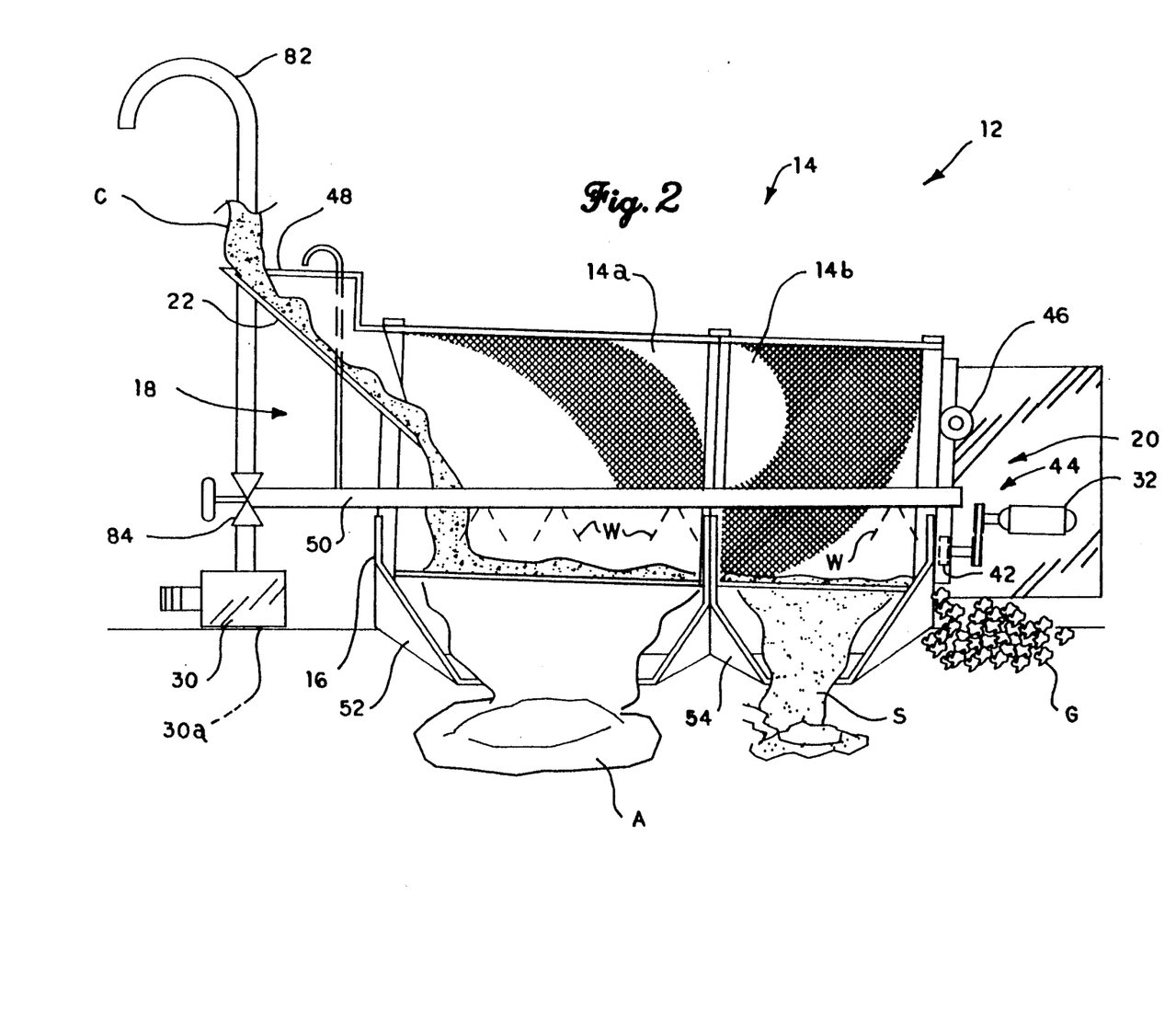
FIG. 2 is a side elevational view of the concrete processor, partially broken away to reveal internal detail.

A four element pushbutton station 28 controls a motorized pump 30 and a screen rotating motor 32 (pump 30 and motor 32 seen in FIG. 2). Each motor 30A or 32 has an "On" and "Off" button 34,36 (respectively). The screen rotating motor 32 is interlocked with the pump motor 30A by a well known permissive circuit (not shown) such that screen 14 can rotate only when water is being supplied, although the pump 30 can operate independently. A disconnect switch 38 and a control panel 40 housing electrical controls (not shown) are seen in this view.

Turning to FIG. 2, rotational drive of screen 14 is seen to include a motor 32, which turns a drive roller 42 through a drive which may include a pulley and belt arrangement 44, gears and shafts (not shown), or other suitable apparatus turning screen 14 at a desired speed. Screen 14 roots upon a series of strategically located coster rollers, one of which is indicated at 42. Screen 14 is turned by an otherwise conventional chain and sprocket jackshaft assembly. Additional rollers (not shown), secured to frame 16, are provided to support screen 14 in its operative position, and to enable rotation. One or more thrust rollers 46 (one being shown) accommodate an axial load bearing toward the lower end 20 of screen 14.

When the concrete processor 12 is operated, water is fed under pressure from pump 30 to a water ring 48 which wets and cleans the walls of cleaning hopper 22, and into a spray bar 50. Water ring 48 comprises a conduit having periodically located water discharge orifices (conduit and orifices not shown), and distributes water supplied under pressure from pump 30. Spray bar 50 discharges water in a manner to be discussed further hereinafter against fresh concrete C entering screen 14. The fine mesh section 14A of screen 14 retains sand S and gravel G, and enables escape of a cement slurry A into a chute 52. Remaining sand S and gravel G migrate downwardly due to inclination of the screen 14, and under the influence of tumbling as a result of screen rotation, thus passing into the coarse mesh section 14B of screen 14. Sand S and some incidental water pass into chute 54, and washed gravel G remains to be discharged axially from the lower open end 20 of screen 14.

Figure 3:
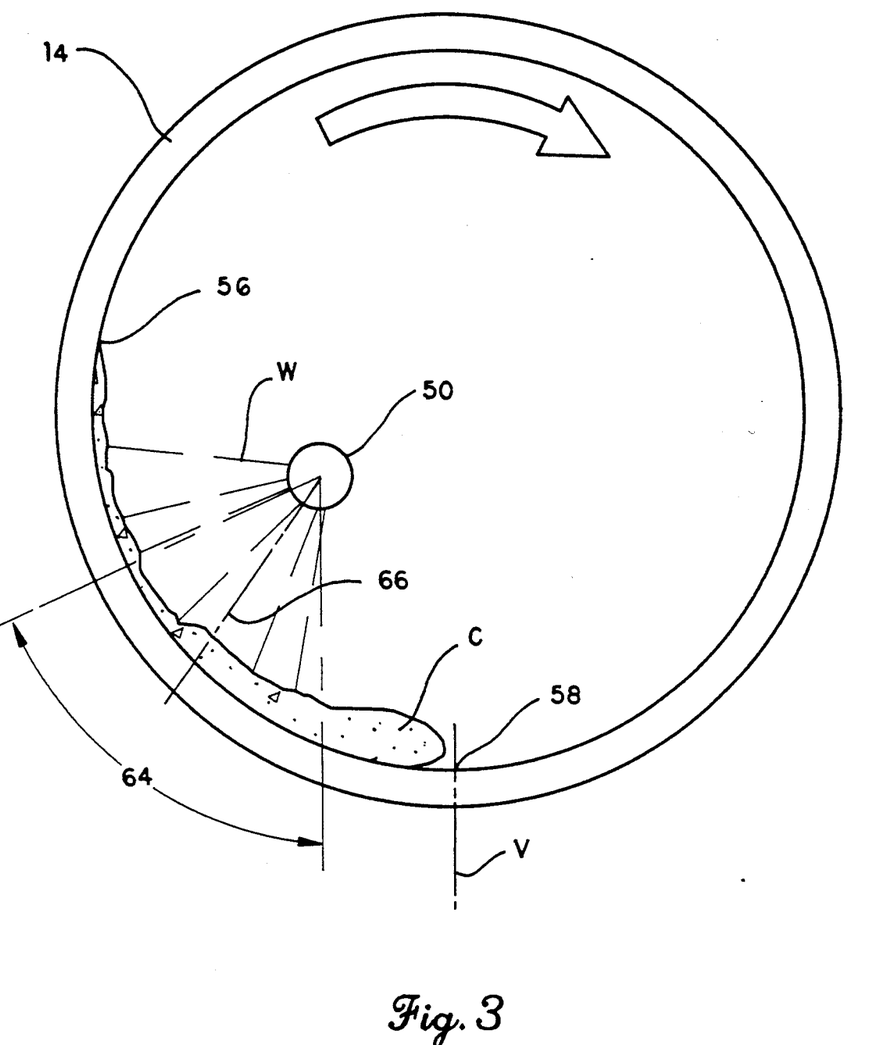
FIG. 3 is a side elevational, cross sectional view of the rotating screen and water spray pipe, taken along any representative point of FIG. 2.

Efficient separation of concrete components A,S,G depends upon effective use of water W, as explained with reference to FIG. 3. As screen 14 rotates, as indicated by arrow, concrete C is drawn upwardly, eventually tumbling down as it reaches a point generally indicated by 56. Rotation also causes the fluent mass to remain to the left, in this view, of a lowermost point within screen 14, generally indicated by 58. The spray bar 50 is arranged eccentrically within cylindrical screen 14, near the fresh concrete C. Water W is preferably discharged in flat, fan shaped sheets 60, as will be further explained with reference to FIGS. 4 and 5.

Figures 4, 5:
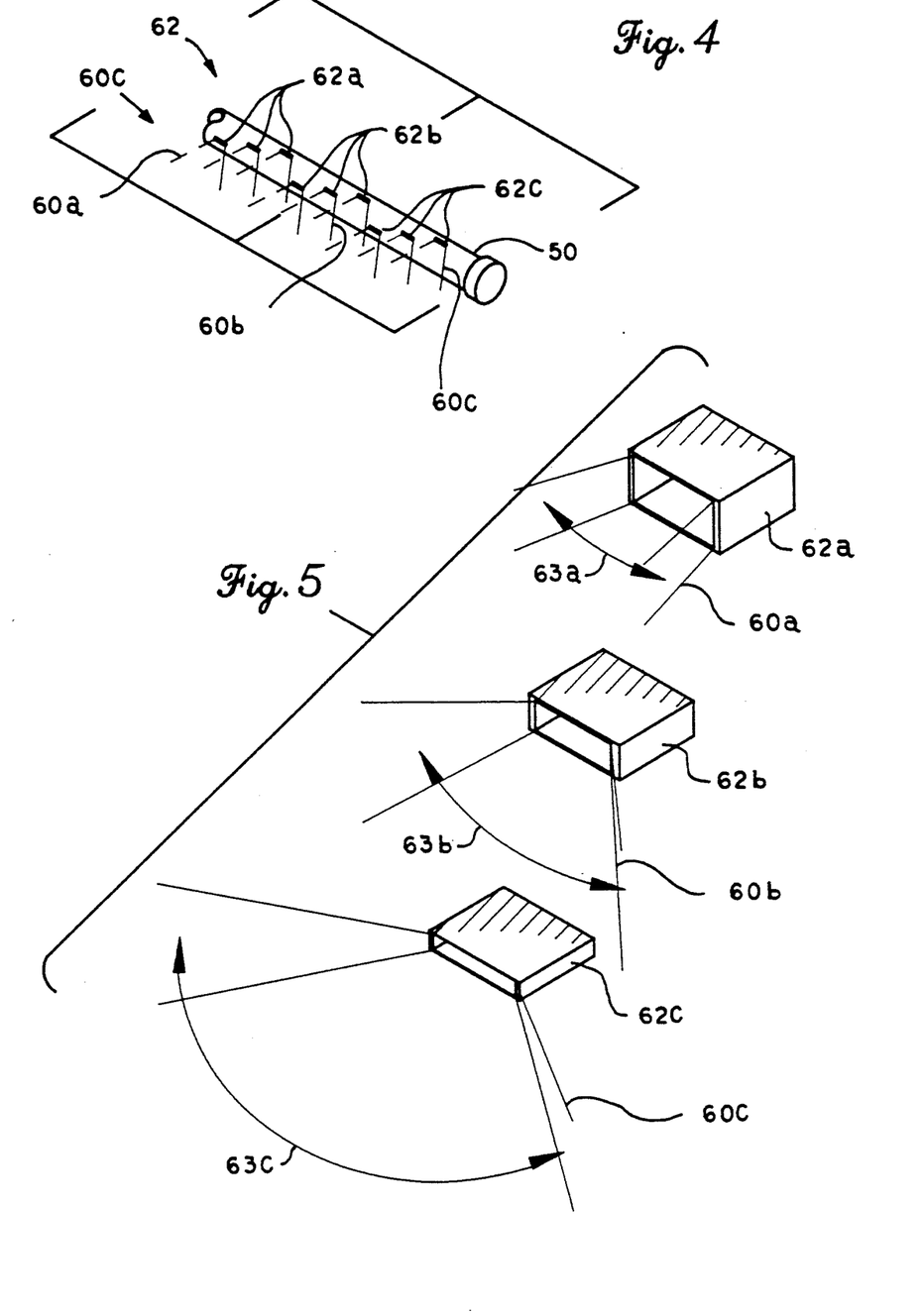
FIG. 4 is a detail view of the water spray pipe.
FIG. 5 is a detail view representing water discharge nozzles in their respective order as located along the water spray pipe.

Referring first to FIG. 4, nozzles 62 are arranged in a pattern of recurring helical lines along spray bar 50. Nozzles 62 are arranged to discharge jets 60 progressively evolving from an initial, heavy jet 60A to lighter, more diffused jets 60B, 60C, in the following manner. Initial nozzles 62A, that is, nozzles located closest to entry of fresh concrete C into screen 14, are configured to produce a thick jet 60A of relatively narrow angle 63A, as seen in FIG. 5. Nozzles 62B located downstream from initial nozzles 62A are configured to produce a thinner jet 60B of greater angle 63B. Nozzles 62C located toward the discharge end 20 of screen 14 produce the thinnest jet 60C, spread over the greatest angle 63C. In combination with the partially helical distribution of nozzles 62 along spray bar 50, the following effect is achieved.

Fresh concrete C is initially bombarded with a heavy jet 60A, subjecting a localized area of impact to relatively greater force. In the early stages, therefore, fresh concrete C is disintegrated under both force of water and also by dilution as the fresh concrete C tumbles. In subsequent areas of impact, momentum of water acting on the fresh concrete C is lessened, but this water is spread over a wider area, thus promoting disintegration by dilution after impact has maximized its usefulness.

Nozzles 62 are further arranged to discharge water jets 60 so that sheets of water defined thereby are parallel, thus avoiding interfering with one another, and remaining able to impinge upon the fresh concrete C in the manner described above. Since nozzles 62 are pitched at several angles, water jets 60, when viewed from the side, as seen in FIG. 3, contact fresh concrete C along an arc 64. Nozzles 62 are arranged such that an arcuate water jet 60 is centered between points 56 and 58. A preferred arc 64 is approximately 45 degrees wide, a bisecting line 66 being displaced from a vertical direction V at point 58 by 45 degrees. Arc 64 and length of screen 14 thus define a band of impingement (not specifically shown) of water W with fresh concrete C existing from 22.5 degrees to 67.5 degrees displaced from the vertical at point 58.

In a preferred embodiment of the present invention, concrete processor 12 has a screen 14 of 5 foot (1.5 meter) diameter, the fine screen section 14A being 10 feet (3 meters) long, and the coarse screen section 14B being 6 feet (1.8 meters) long. When this embodiment of the invention is operated at a rotational speed passing screen 14 by an arbitrary benchmark (not shown) at a rate between 300 feet (91 meters) and 360 feet (110 meters) per minute, it will consume between 140 gallons (530 liters) and 215 gallons (815 liters) of water per cubic yard (0.8 cubic meter) of concrete processed. When screen 14 of this embodiment is rotated at 21 revolutions per minute, actual consumption, when processing this quantity of concrete, is 178 gallons (674 liters) of water per minute, screen 14 passing the arbitrary benchmark at 330 feet (100 meters) per minute.

Water pressure need be only 12 pounds per square inch (83 kPa) to achieve satisfactory water distribution.

Figure 6:
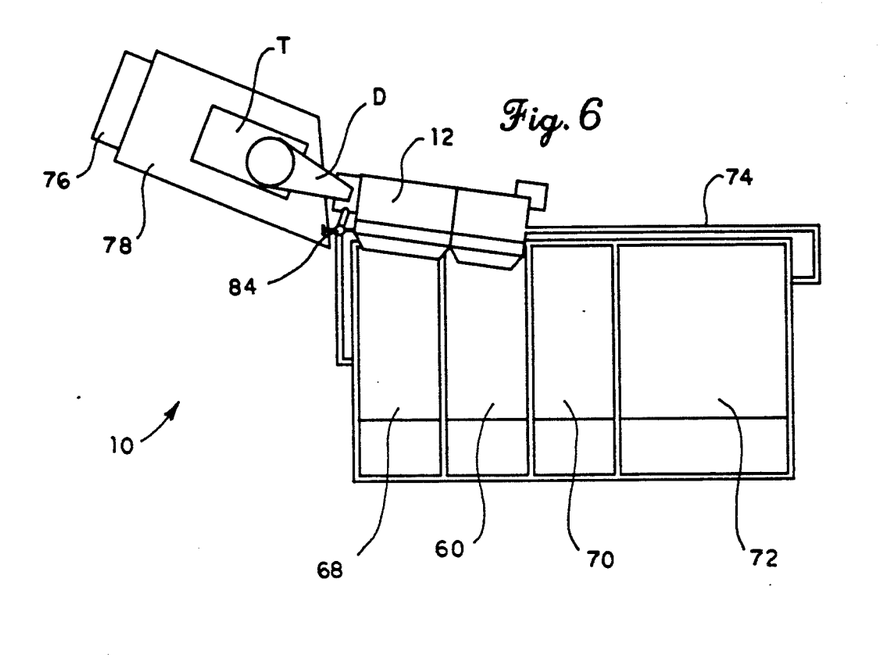
FIGS. 6 and 7 are, respectively, a top plan view and side elevational diagrammatic view of the concrete processor and associated storage pits.

Preferably, the novel concrete reclaimer 10 is furnished with storage pits 68, 69, 70, 72. As seen in FIG. 6, pits 68, 69, 70 are arranged to store large quantities of cement slurry A, sand S, and gravel G. Water pit 72 enables recirculation of recovered water W. A conduit 74 is easily connected to pump 30 to form a recirculation system.

Figure 7:
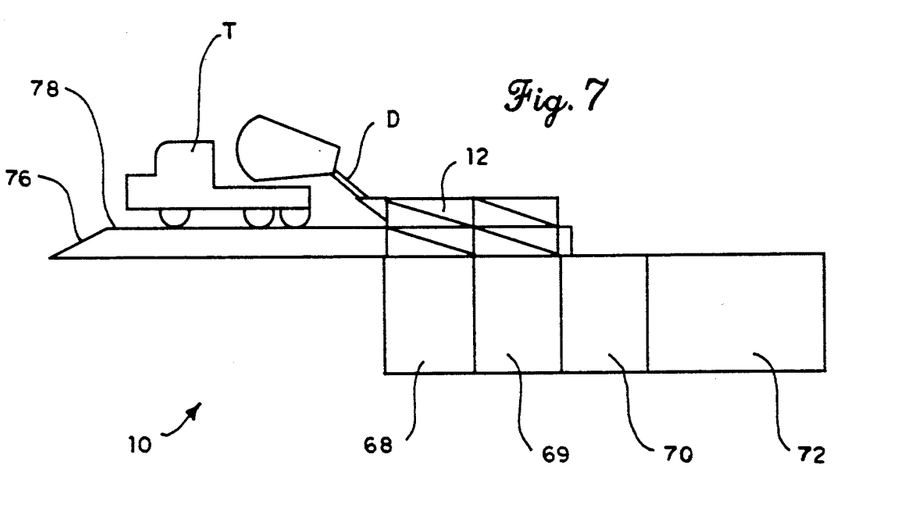

To facilitate unloading of fresh concrete C, concrete processor 12 is located at a level above pits 68, 69, 70, 72, as seen in FIG. 7. A ramp 76 and elevated platform 73 enable a cement truck T to drive up to the concrete processor 12 and discharge fresh concrete C using the conventional truck discharge chute D. Platform 78 can be drained into water storage pit 72 so that all water W, including water used to wash truck T, can be recirculated.

The concrete processor 12 enables ready truck washing by a washer davit 82, best seen in FIG. 2. A diverter valve 84 directs water W from pump 30 to flow to spray bar 50, or, alternatively, up into washer davit 82. Washer davit 82 is dimensioned and configured to discharge water W at a height and location convenient for truck operators to wash their vehicles.

It is to be understood that the present invention is not limited to the sole embodiment described above, but encompasses any and all embodiments within the scope of the following claims.

I claim:

1. For use with fresh concrete to be disposed, a reclaiming apparatus including a concrete processor comprising:

rotatable screen means including at least two screen elements defining a cylindrical surface having a longitudinal axis and also having open ends, a first one of said at least two screen elements being of a relatively fine mesh, for passing cement slurry therethrough and preventing passage of sand and gravel therethrough, and a second one of said at least two screen elements being of a relatively coarse mesh, for passing sand therethrough and preventing passage of gravel therethrough, said rotatable screen means being inclined with respect to horizontal, one of said open ends being relatively higher, and the other of said open ends being relatively lower, whereby fresh concrete is introduced into said higher open end and migrates toward said lower open end, motor and drive means fastened to said concrete processor and rotatably connected to said rotatable screen means, and spray pipe means extending longitudinally within said cylindrical outer configuration and including means defining orifices through which water sprays when introduced under pressure into said spray pipe means, said spray pipe means being disposed eccentrically within said cylindrical screen means outer configuration, and being offset downwardly from said longitudinal axis towards concrete being processed, whereby water sprays unimpeded toward said rotatable screen means, through concrete being processed.

2. The reclaiming apparatus according to claim 1, said spray pipe means having a plurality nozzles configured to discharge arcuate jets of water when water is supplied under pressure thereto, initial nozzles being configured to discharge thick jets of narrow angle of arc, and subsequent nozzles being configured to discharge jets of relatively wider angles of arc and of less thickness.

3. The reclaiming apparatus according to claim 1, said spray pipe means having a plurality of nozzles for discharging water therethrough when water is supplied under pressure, said nozzles being arranged longitudinally along said spray pipe means in a pattern of recurring helical sequences.

4. The reclaiming apparatus according to claim 1, said spray pipe means having a plurality nozzles configured to discharge arcuate jets of water when water is supplied under pressure thereto, initial nozzles being configured to discharge thick jets of narrow angle of arc, and subsequent nozzles being configured to discharge jets of relatively wider angles of arc and of less thickness, said nozzles being arranged longitudinally along said spray pipe means in a pattern of recurring helical sequences.

5. The reclaiming apparatus according to claim 1, said nozzles being arranged to discharge water at angle, with respect to a vertical direction, in a range of 22.5 degrees to 67.5 degrees therefrom.

6. The reclaiming apparatus according to claim 1, said nozzles being disposed to discharge water jets in a series of parallel sheets, thus causing water to strike concrete being processed along a band of contact.

7. The reclaiming apparatus according to claim 1, said concrete processor further including first and second chute means, located respectively along said first one and said second one of said at least two screen elements, whereby cement slurry is segregated from sand and gravel, and is constrained to flow in a desired path by said first chute means and sand is segregated from cement slurry and gravel, and is constrained to flow in a second desired path by said second chute means.

8. The reclaiming apparatus according to claim 1, further including pump means for pressurizing a water supply, thus causing water to flow into said spray pipe means, and motor means for operating said pump means.

9. The reclaiming apparatus according to claim 8, further including diverter valve means for shutting off water flow to said concrete processor, and enabling water flow to a conduit open to the atmosphere and accessible to an operator, whereby water is made available for general cleaning without water flowing in said concrete processor.

10. The reclaiming apparatus according to claim 1, further including frame means supporting said concrete processor at an angle to the ground.

11. The reclaiming apparatus according to claim 10, said frame means further including adjustable leg means, whereby said concrete processor is selectively supported at a desired angle to the ground.

12. The reclaiming apparatus according to claim 1, further including a pit system comprising:

first pit means located below said first chute means, thereby collecting and storing cement slurry segregated by said concrete processor, second pit means located below said second chute means, thereby collecting and storing sand segregated by said concrete processor, third pit means located below said lower open end, thereby collecting and storing gravel segregated by said concrete processor, and fourth pit means for storing water flowing in said second chute means and out from said lower end.

13. A method of reclaiming fresh concrete, comprising the steps of:

a) introducing fresh concrete into an inclined screen forming a closed geometric shape with two open ends, the inclined screen having a first, relatively fine screen element and a second, relatively coarse screen element, the screen elements being ordered with respect to fresh concrete flowing downwardly across the inclined screen, b) rotating the screen at a rotational speed, thus causing the fresh concrete to both tumble and to flow downwardly with respect to screen inclination, c) constraining rotational speed such that the screen element moves past a stationary reference point at a rate between 300 feet (100 meters) and 360 feet (120 meters) per minute, d) discharging water against the fresh concrete, whereby fresh concrete is separated into cement slurry, sand, and gravel components.

14. The method of claim 13, further including a final step e) constraining water to flow at a rate between 140 gallons (530 liters) and 215 gallons (815 liters) per minute.

15. The method of claim 13, further including a final step f) directing the respective cement slurry, sand, and gravel into three segregated streams.

16. The method of claim 13, further including final steps
 e) constraining fresh concrete to be introduced into the inclined screen at a rate of 1 cubic yard (0.8 cubic meter) per minute, and
 g) constraining water to flow at a rate between 140 gallons (530 liters) and 815 liters) per minute.

* * * * *